(No Model.)
F. J. FERRELL.
VALVE.
No. 450,451. Patented Apr. 14, 1891.
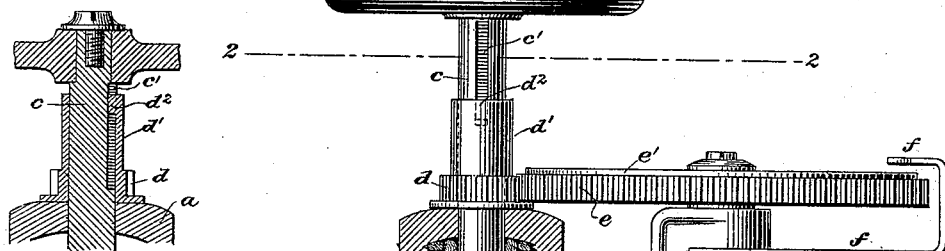
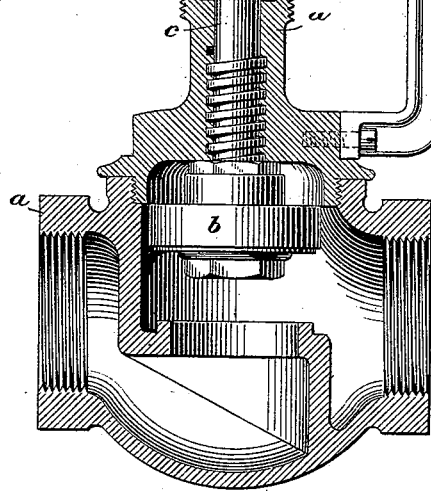
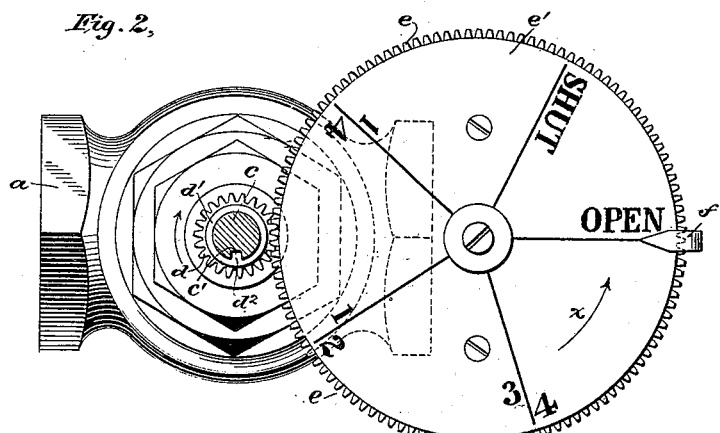
Witnesses
Geo. W. Breck
Henry W. Lloyd
Inventor
Frank J. Ferrell
By his Attorney
Henry D. Williams

UNITED STATES PATENT OFFICE.

FRANK J. FERRELL, OF NEW YORK, N. Y.

VALVE.

SPECIFICATION forming part of Letters Patent No. 450,451, dated April 14, 1891.

Application filed May 31, 1890. Serial No. 353,813. (No model.)

*To all whom it may concern:*

Be it known that I, FRANK J. FERRELL, a citizen of the United States, residing at New York, county and State of New York, have invented certain new and useful Improvements in Valves, of which the following is a specification, reference being had to the accompanying drawings, forming part hereof.

This invention relates to valves for regulating and controlling fluids, and has for its object to provide an improved indicator for visually indicating the exact amount of opening of the valve. This improved indicator can be readily applied to any ordinary valve. It is simple and inexpensive in construction and positive in operation.

In the accompanying drawings, Figure 1 is a longitudinal vertical section of a globe-valve with my improved indicator applied thereto. Fig. 2 is a horizontal section of the same on the line 2 2, Fig. 1. Fig. 3 is a detached section of a portion of the upper part of the valve-stem.

The globe-valve casing $a$ and the valve $b$ are of ordinary construction. The threaded valve-stem $c$ is connected with the valve and casing, so that it is both moved longitudinally and rotated in operating the valve. It is also of ordinary construction, except that it has a longitudinal groove or keyway $c'$ formed in its upper part. This groove $c'$ is cut in the stem from the extreme upper end of the stem downward. It is long enough to receive in all positions of the valve a projecting stud or spline from a portion of the indicating device, but does not extend downward sufficiently to come in contact with the packing around the valve-stem. This is made clear in Fig. 3, in which drawing the relative positions of the valve-stem and casing when the valve is closed and the valve-stem is in lowest position are shown.

The indicating device comprises a toothed pinion $d$, having a sliding connection with the valve-stem, a large gear-wheel $e$, meshing into the pinion $d$ and provided with indicating-markings, and a fixed index $f$, which, in conjunction with the marks of the gear-wheel $e$, indicates the position of the valve. The toothed pinion $d$ is fitted upon or forms part of a sleeve $d'$, fitted loosely upon the valve-stem $c$. A stud or spline $d^2$ projects from the upper part of this sleeve $d'$ into the longitudinal groove $c'$ of the valve-stem. This stud-and-groove connection between the pinion and valve-stem causes them to rotate together and yet permits the valve-stem to move longitudinally independently of the pinion. The arrangement of the long sleeve $d'$ with the stud $d^2$ at its upper part permits the groove in the valve-stem to be so located as not to enter the packing around the valve-stem in any position of the valve, as above explained. A flange is provided at the lower end of the pinion $d$. This flange rests upon the top of the casing $a$ and extends partly under the large gear-wheel $e$, and thus effectually prevents longitudinal movement of the pinion $d$ when the valve-stem is operated. The large gear-wheel $e$ is fitted to rotate upon an arm $g$, secured to or forming part of the casing $a$. The indicating plate or disk $e'$ is secured to or forms part of the gear-wheel $e$. The index $f$ projects from the arm $g$ and its upper end is adjacent to the indicating-plate $e'$. The marks upon the indicating-plate $e'$ are at the parts of the indicating-plate which come under the index when the valve is in the positions indicated by the marks. Thus in Figs. 1 and 2 the valve is open to its full extent, and therefore mark "Open" is directly under the point of the index $f$.

The arrow $x$ indicates the direction of motion of the indicating-disk when the valve is being closed. The stroke of the valve is shown divided into quarters. It is evident that any other fractional division and marking may be used. The relative sizes and number of teeth of the pinion $d$ and gear-wheel $e$ are preferably so adjusted that one complete stroke of the valve will cause less than one revolution of the wheel $e$, as shown.

My invention is designed for attachment to ordinary valves, such as shown in the drawings. The stud-and-groove connection between the valve-stem and valve and the flanged pinion $d$ constitute a simple and efficient connection between the indicating-wheel and the rotating and longitudinally-moving valve-stem. Its attachment to a valve does not in any way interfere with the ordinary functions of the valve and but very slightly modifies the construction of the valve. The indications are positive and unmistakable and can be read at a glance.

The device is strong and will not readily get out of order, and yet is simple and inexpensive in construction.

Having thus described my invention, what I claim as new, and desire to secure by Letters Patent, is—

1. The combination, with a valve, a valve-stem which is both moved longitudinally and rotated in operating the valve, and a valve-casing, of a toothed pinion fitted loosely upon the valve-stem, a sliding stud-and-groove connection between the valve-stem and pinion, a flange on the pinion between the teeth of the pinion and the casing, a gear-wheel meshing in the pinion and provided with an indicating-plate, an arm of the casing on which the gear-wheel is fitted to rotate, and a fixed index projecting from the casing and arranged adjacent to the indicating-plate, substantially as set forth.

2. The combination, with a valve and valve-casing and a valve-stem which is both moved longitudinally and rotated in operating the valve and provided with a longitudinal groove $c'$ in the part of the stem which does not enter the packing or casing in any position of the stem, of the toothed pinion $d$ on the sleeve $d'$, provided with the stud $d^2$, arranged at the end of the sleeve farthest from the casing and working loosely in the groove $c'$, the gear-wheel $e$, meshing in the pinion and provided with the indicating-plate $e'$, the arm $g$, on which the wheel $e$ is fitted to rotate, and the fixed index $f$, projecting from the arm $g$ and arranged adjacent to the indicating-plate, substantially as set forth.

FRANK J. FERRELL.

Witnesses:
HENRY D. WILLIAMS,
SIDNEY MANN.